United States Patent Office 2,996,250
Patented Aug. 15, 1961

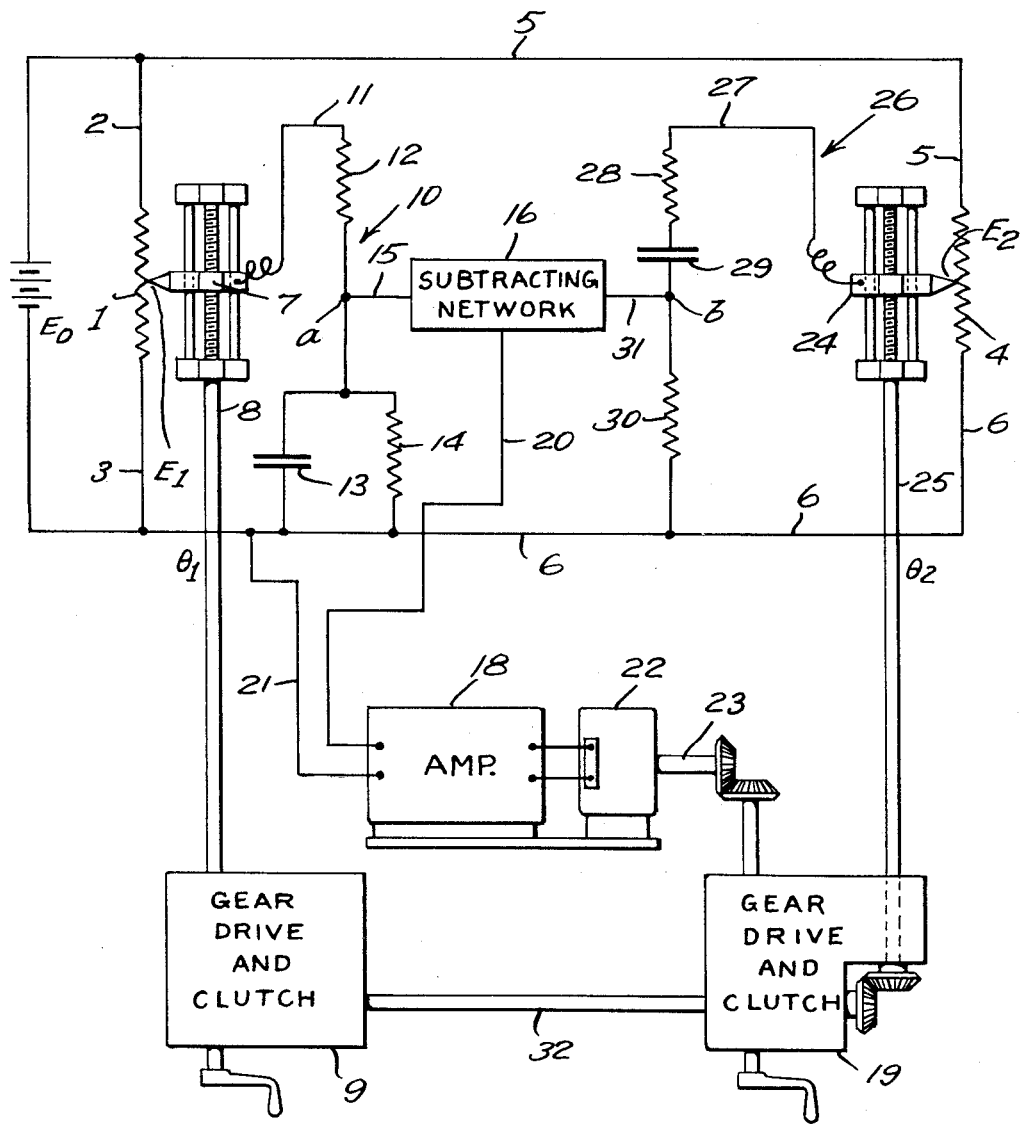

2,996,250
INTEGRATOR-DIFFERENTIATOR
Stanley Schenkerman, Forest Hills, N.Y., assignor to Sperry Rand Corporation, Ford Instrument Company Division, Long Island City, N.Y., a corporation of Delaware
Filed Jan. 28, 1958, Ser. No. 711,613
7 Claims. (Cl. 235—183)

This invention relates to electrical computers and particularly to circuit arrangements capable of performing integration and differentiation. Integrating computers are usually of the mechanical ball and disc type of device which requires means for turning the disc at constant speeds, such as precise timing motors. Integrators are known to the art which employ electric circuits exclusively which have depended upon the use of the resistive and capacitive networks, the parameters of which are made so small or large that they may be neglected.

The present invention contemplates the use of capacitive-resistive networks in a self-balancing servo system which accurately performs computation without the introduction of nominal error factors and which does not require a constant reference source as in the case of a mechanical integrator. In comparison with the mechanical devices, the unit is small and light and has a transient response limited only by a single servo motor rather than by the inertia of a mechanical integrator.

An object of the invention, therefore, is to provide an electrical network for performing integration and differentiation.

Other objects and advantages of the invention may become apparent from reading the following detailed description of one embodiment thereof in conjunction with the drawing which schematically illustrates an electromechanical integrator.

Referring to the drawing, a potentiometer 1 is connected across a battery $E_0$ by means of leads 2 and 3. A second potentiometer 4 is connected to the terminals of potentiometer 1 by means of leads 5 and 6 and hence is also energized by the battery source $E_0$. A variable tap 7 is provided in contact with the winding of the potentiometer 1 being driven by shaft 8 which conveys a system input $\theta_1$ which may be cranked in through gear drive and clutch 9.

A resistor-capacitor voltage dividing network 10 is connected to the variable tap slide 7 by means of lead 11 and comprises a resistor 12 in series with a parallel arrangement including a capacitor 13 and resistor 14 which are joined to the lead 6.

A lead 15 is joined to the network being connected at a point located between the resistor 12 and the parallel arrangement. The other end of the lead 15 is connected side of the subtracting network 16.

An amplifier 18 receives the output of the subtracting network on lead 20, and is also connected to one end of the reference source $E_0$ by means of lead 21 which is joined to the lead 6. The amplifier 18 is in driving connection with a servo motor 22, the output of which is placed on the armature shaft 23 to convey the analog value $\theta_2$.

Variable tap slider 24 of the potentiometer 4 is driven by shaft 25 which is connectable to the armature shaft 23 thru a clutch and gear train box 19. A second resistor capacitor voltage dividing network is connected to the variable tap slider 24 by means of lead 27. The system includes a resistor 28, capacitor 29 and resistor 30 in series combination, the system being connected at its opposite end to the battery lead 6. A lead 31 connects the second resistor capacitor system at point $b$ located between the capacitor 29 and the resistor 30 to the other side of the subtracting network 16.

In operation, the battery $E_0$ initially establishes a reference voltage for the computer. Rotation of the input shaft 8 turns the variable tap slider 7 of the potentiometer 1 and a proportional voltage $E_1$ is picked off. The resistor capacitor system 10 serves as a voltage divider to produce a voltage $V_1$ at point $a$. By considering the $V_1$ and $E_1$ as functions of radian frequency, $\omega$, it may be shown by fundamental network theory that the voltage $V_1$ is given by the following equation where $j$ is the imaginary operator $\sqrt{-1}$, 1. $$V_1 = \left[\frac{R_2}{R_1 + R_2}\right] \frac{E_1}{1 + \left(\frac{R_1 R_2}{R_1 + R_2}\right) C J \omega}$$

where $R_1$ and $R_2$ are the resistance values of the resistors 12 and 14, respectively, and C is the capacitance of the capacitor 13.

The servo motor 22 will drive until the output of the subtracting network 16 is zero; that is the motor output $\theta_2$ positions the slider of the potentiometer 4 to produce a proportional voltage $E_2$ and a voltage $V_2$ at point $b$. In a manner similar to the derivation for the voltage $V_1$ the voltage $V_2$ is given by the following equation, 2. $$V_2 = E_2 \left[\frac{R_4 C J \omega}{1 + (R_3 + R_4) C J \omega}\right]$$

where $R_3$ and $R_4$ are the resistance values of the resistors 28 and 30, respectively, and C is the capacitance of the capacitor 29. The motor 22 will stop when the voltages $V_1$ and $V_2$ are equal. When the computer is in this condition, the voltage relations for $V_1$ and $V_2$ is equated as follows:

3. $$E_1 \left[\frac{R_2}{R_1 + R_2}\right] \left[\frac{1}{1 + \left(\frac{R_1 R_2}{R_1 + R_2}\right) C J \omega}\right]$$
$$= E_2 \left[\frac{R_4 C J \omega}{1 + (R_3 + R_4) C J \omega}\right]$$

If we for convenience define

4. $$\alpha = \frac{R_2}{R_1 + R_2}$$

By matching $R_1$, $R_2$, $R_3$ and $R_4$ so that

5. $\quad\quad\alpha R_1 = R_3 + R_4$

Equation 3 reduces to

6. $\quad\quad E_1 \alpha = E_2 R_4 C J \omega$ or since $E_1$ and $E_2$ are directly proportional to $\theta_1$ and $\theta_2$, respectively 7. $\quad\quad \theta_2 = \left[\frac{\alpha}{R_4 C}\right] \frac{\theta_1}{J\omega}$ where $\frac{\alpha}{R_4 C}$ is constant.

From the theory of differential equations, it is known that the division by $J\omega$ is equivalent to integrating with respect to time. Therefore, 8. $$\theta_2 = \frac{\alpha}{R_4 C} \int \theta_1 dt$$

If desired, the armature shaft 23 may be disengaged from the shaft 25 in the gear drive and clutch 19 and placed in driving connection with the shaft 8 by means of return shaft 32 which can selectively drive the shaft 8 through the gear drive and clutch 9. By disconnecting the armature shaft 23 from the shaft 25 and placing it in driving relation to the shaft 8, $\theta_2$ may serve as the computer input and $\theta_1$ is introduced by the motor as the compared output of the two voltage dividing networks. By thus reversing the input and output of the computer the latter may be employed as a differentiator. The quantity $\theta_1$ is then determined according to the following relation.

9. $$\theta_1 = \left[\frac{R_4 C}{\alpha}\right]\frac{d\theta_2}{dt}$$

Various modifications may be effected in the described embodiment of the invention by a person skilled in the art without departing from the principle and scope of the invention as defined in the appended claims.

What is claimed is:

1. A computer comprising an adjustable voltage source having a variable tap slider, a resistor-capacitor voltage dividing network connected to said variable tap slider, a subtracting network one side of which is connected to said voltage dividing network, a second adjustable voltage source having a variable tap slider, a second resistor-capacitor voltage dividing network connected to the said variable tap slider of said second source, said second voltage dividing network being connected to the other side of said subtracting network, drive means connected to receive the output of said subtracting network and means for feeding the output of said drive means to one of said adjustable voltage sources for controlling the voltage output thereof.

2. A computer comprising an adjustable voltage source having a variable tap slider, a resistor-capacitor voltage dividing network connected to said variable tap slider, said network comprising a resistor in series with a parallel arrangement comprising a capacitor and a resistor, a subtracting network one side of which is connected to said voltage dividing network, between said resistor and the parallel arrangement therein, a second adjustable voltage source having a variable tap slider, a second resistor-capacitor voltage dividing network connected to the said variable tap slider of said second source, said second network comprising in series a first resistor, a capacitor and second resistor, said second voltage dividing network being connected at a point between the second resistor and said capacitor to the other side of said subtracting network, drive means connected to receive the output of said subtracting network and means for feeding the output of said drive means to one of said adjustable voltage sources for controlling the voltage output thereof.

3. A computer comprising an adjustable voltage source having a variable tap slider, a resistor-capacitor voltage dividing network connected to said variable tap slider, said network comprising a resistor in series with a parallel arrangement comprising a capacitor and a resistor, a subtracting network one side of which is connected to said voltage dividing network, between said resistor and the parallel arrangement therein, a second adjustable voltage source having a variable tap slider, a second resistor-capacitor voltage dividing network connected to the said variable tap slider of said second source, said second network comprising in series a first resistor, a capacitor and second resistor, said second voltage dividing network being connected at a point between the second resistor and said capacitor to the other side of said subtracting network, drive means connected to receive the output of said subtracting network, the output of said drive means being in selective connection with said voltage dividing networks.

4. A computer comprising an adjustable voltage source having a variable tap slider, a resistor-capacitor voltage dividing network connected to said variable tap slider, said network comprising a resistor in series with a parallel arrangement comprising a capacitor and a resistor, a subtracting network connected to said voltage dividing network at a point between the first mentioned resistor and said parallel arrangement, drive means connected to said subtracting network and said voltage source, a second adjustable voltage source having a variable tap slider, a second resistor-capacitor voltage dividing network connected to the said variable tap slider of said second source, said second voltage dividing network comprising in series a first resistor, a capacitor and a second resistor connected to said voltage source and said subtracting network being connected to said second voltage dividing network at a point between said capacitor and said second resistor.

5. A computer comprising a reference source, a potentiometer connected across said reference source, said potentiometer having a slider and a slider positioning shaft joined thereto, a resistor capacitor voltage dividing network, one side of said network being connected to said slider and the other side of the network being connected to one side of said reference source, said network including a resistor in series with a parallel arrangement including a capacitor and resistor, a subtracting network connected to said network between the series resistor and said parallel arrangement, drive means connected to said reference source and said subtracting network, a second potentiometer connected across said reference source, said second potentiometer having a slider, said drive means being in selective operating connection with the sliders of the two potentiometers, a second resistor capacitor voltage dividing network, one side of said second network being connected to said slider and the other side being connected to said reference source, said second network comprising in series a resistor, capacitor and a second resistor, and said subtracting network being connected to said second network at a point between said capacitor and said second resistor.

6. A computer comprising a voltage source, a potentiometer having a winding connected across said voltage source and an adjustable tap slider, a subtracting network, a resistor-capacitor voltage dividing network interposed between said tap slider and said voltage source and connected to one side of said subtracting network, a second potentiometer having a winding connected across said voltage source and an adjustable slider, a second voltage-dividing network interposed between the slider of said second potentiometer and said voltage source and connected to the other side of said subtracting network, drive means connected to receive the output of said subtracting network, and means for feeding the output of said drive means to one of said adjustable tap sliders for controlling the voltage output thereof.

7. A computer comprising a voltage source, a potentiometer having a winding connected across said voltage source and an adjustable tap slider, a subtracting network, a voltage dividing network comprising a resistor disposed in series with a parallel arrangement consisting of a capacitor and a resistor interposed between said tap slider and said voltage source and connected to one side of said subtracting network, a second potentiometer having a winding connected across said voltage source and an adjustable tap slider, a second voltage dividing network comprising in series a resistor, a capacitor and a second resistor interposed between the slider of said second potentiometer and said voltage source and connected to the other side of said subtracting network, manually operated means by which one of said tap sliders is adjusted in accordance with a desired input value, an amplifier which is connected to the output of said subtracting network and to one side of said voltage source, and a servo motor which is driven by said amplifier and is operative to adjust the other of said tap sliders.

References Cited in the file of this patent

UNITED STATES PATENTS

| | | |
|---|---|---|
| 2,779,872 | Patterson | Jan. 29, 1957 |
| 2,817,800 | Schroeder | Dec. 24, 1957 |
| 2,836,357 | Hoell | May 27, 1958 |